(12) United States Patent
Stern et al.

(10) Patent No.: US 7,380,321 B2
(45) Date of Patent: Jun. 3, 2008

(54) MACHINING TECHNIQUE WITH SELECTIVE AND LOCALIZED PLACEMENT OF TOOLING MATERIAL

(75) Inventors: Eric J. Stern, Valmeyer, IL (US); Amy M. Helvey, Imperial, MO (US); David P. Heck, St. Peters, MO (US); Ricky L. Martin, St. Peters, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/391,638

(22) Filed: Mar. 28, 2006

(65) Prior Publication Data

US 2007/0226977 A1    Oct. 4, 2007

(51) Int. Cl.
*B23P 15/02*    (2006.01)
*B21K 3/00*    (2006.01)
(52) U.S. Cl. ..................... 29/33 K; 29/899.6
(58) Field of Classification Search ............... 29/33 K, 29/889.7, 889.71, 889.72, 889.6, 527.1, 592; 409/80; 83/788, 820; 419/1, 48, 49, 52; 76/101.1, 107.1; 249/105, 117, 134, 135, 249/16; 72/362, 377, 343, 352, 356, 358, 72/359, 264, 266, 267, 67, 69, 353.2, 355.2, 72/355.6; 425/405.2, 405.1, 78; 264/101, 264/102, 109
See application file for complete search history.

(56) References Cited

U.S. PATENT DOCUMENTS

| 2,544,455 | A | * | 3/1951 | Goulding ............... 29/895.213 |
|---|---|---|---|---|
| 2,585,677 | A | * | 2/1952 | Preston ........................ 72/244 |
| 2,950,188 | A | * | 8/1960 | Thurber et al. ................. 420/1 |
| 3,077,646 | A | * | 2/1963 | Magnus Tigerschiold .... 164/16 |
| 3,116,831 | A | * | 1/1964 | Harwood et al. ............. 72/257 |
| 3,121,950 | A | * | 2/1964 | Maier et al. ................. 228/118 |

(Continued)

OTHER PUBLICATIONS

Unknown Author, Basics of Friction Stir Welding, ESAB Cutting Systems Website, Available as early as Nov. 28, 2005, URL: http://www.esabcutting.com/products/machines/Basics%20of%20FrictionStirWelding.cfm.

(Continued)

*Primary Examiner*—Dana Ross
(74) *Attorney, Agent, or Firm*—Ostrager Chong Flaherty & Broitman P.C.

(57) ABSTRACT

A method of holding a billet of material (70) to a machining table (106) includes determining a first set of outer dimensions of a component (72) to be machined. The billet of material (70) is selected in response to the first set of outer dimensions to have a second set of outer dimensions. Dimensions of the second set of outer dimensions are approximately equal to or greater than corresponding dimensions of the first set of outer dimensions. Multiple tabs (76) are attached to the billet of material (70). The tabs (76) are rigidly fixed to the machining table (106). A machining system (50) includes a controller (52) that determines a first set of outer dimensions of a component (72) to be machined. A tab-forming mechanism (54) generates multiple tabs (76) that are configured to be rigidly fixed to a machining table (106). An attachment mechanism (56) couples the tabs (76) to a billet of material (70), which has a second set of outer dimensions having the same relation to the first set of outer dimensions previously stated.

9 Claims, 4 Drawing Sheets

U.S. PATENT DOCUMENTS

| | | | | |
|---|---|---|---|---|
| 3,161,110 | A * | 12/1964 | Fitzner | 409/80 |
| 3,192,673 | A * | 7/1965 | Hensley | 451/124 |
| 4,970,925 | A * | 11/1990 | Nakatsuji | 83/384 |
| 5,083,371 | A * | 1/1992 | Leibfried et al. | 29/889.72 |
| 5,144,825 | A * | 9/1992 | Burg et al. | 72/60 |
| 5,598,760 | A * | 2/1997 | Sucic et al. | 83/880 |
| 5,910,894 | A * | 6/1999 | Pryor | 700/95 |
| 6,021,826 | A * | 2/2000 | Daniell | 144/73 |
| 6,234,756 | B1 * | 5/2001 | Ress et al. | 416/220 R |
| 6,282,786 | B1 * | 9/2001 | Evans et al. | 29/889.72 |
| RE37,774 | E * | 7/2002 | Leahy et al. | 29/889.6 |
| 2005/0005445 | A1 * | 1/2005 | Ferte et al. | 29/889.2 |
| 2005/0184432 | A1 * | 8/2005 | Mead | 264/272.15 |
| 2006/0027630 | A1 * | 2/2006 | Talwar et al. | 228/112.1 |
| 2006/0070501 | A1 * | 4/2006 | Hanks et al. | 83/13 |

OTHER PUBLICATIONS

Unknown Author, How are Forgings Produced, Forging Industry Association Website, Available as early as Nov. 28, 2005 URL: http://www.forging.org/facts/wwhy6.htm.

Unknown Author, NC and CNC Machines, Industrial Engineering and Logistics Management Website, Available as early as Nov. 28, 2005 URL: http://iesu5.ieem.ust.hk/dfaculty/ajay.courses/ieem215/lecs/CNC.html.

* cited by examiner

MACHINING TECHNIQUE WITH SELECTIVE AND LOCALIZED PLACEMENT OF TOOLING MATERIAL

TECHNICAL FIELD

The present invention relates generally to milling and machining processes, more particularly, to the techniques used in preparation of and during the stated processes.

BACKGROUND OF THE INVENTION

One technique commonly used in industry as part of a milling or machining process to hold a component, such as an airfoil for an aircraft, is referred to as "picture framing". In machining the component, a center portion of a large billet or block of raw material, consisting typically of steel or aluminum, is machined to form the component. The block of material is oversized such that a predetermined amount of excess material exists around the outer perimeter of the center portion. This excess material forms a "frame" upon which clamps can be fastened to hold the block in place on a milling table during the machining process.

Although picture framing provides a simple technique for milling a component, it has associated disadvantages. One such disadvantage is the inclusion of the excess material to form the frame. The excess material needs to be recycled or discarded. For large parts this excess material is costly and can result in a significant amount of scrap.

In addition, picture framing can only be used when a piece of stock is available that is of proper size to accommodate for the dimensions of the component being machined, as well as for the required and associated framing dimensions. There are often incidents when the stock available is large enough to accommodate only the dimensions of the component and not of a frame. As a result, that component must be machined and assembled as multiple elements or cannot be machined until a billet of material of adequate size is ordered, shipped, and received. The machining and assembling of multiple elements, as opposed to a single unitary structure, can add undesired weight, costs, manufacturing time, and complexity to a system. The assembling or joining of elements reduces the strength of the resultant component, which can lead to fatigue cracks and corrosion.

Thus, there exists a need for an improved technique of holding a block of material to a machining table that does not have the above-stated and associated disadvantages.

SUMMARY OF THE INVENTION

One embodiment of the present invention provides a method of holding a billet of material to a machining table includes determining a first set of outer dimensions of a component to be machined. The billet of material is selected in response to the first set of outer dimensions to have a second set of outer dimensions. Dimensions of the second set of outer dimensions are approximately equal to or greater than corresponding dimensions of the first set of outer dimensions. Multiple tabs are attached to the billet of material. The tabs are rigidly fixed to the machining table.

Another embodiment of the present invention provides a machining system that includes a controller that determines a first set of outer dimensions of a component to be machined. A tab-forming mechanism generates multiple tabs that are configured to be rigidly fixed to a machining table. An attachment mechanism couples tabs to a billet of material, which has a second set of outer dimensions. Dimensions of the second set of outer dimensions are approximately equal to or greater than corresponding dimensions of the first set of outer dimensions.

The embodiments of the present invention provide several advantages. One such advantage is the provision of holding a workpiece on a machining table without the need for a significant amount of excess material commonly associated with picture framing.

The present invention provides a simple, inexpensive, and efficient technique for grabbing and rigidly fixing a workpiece, having dimensions approximately the same as or greater than that of a resultant component to be formed, on a worktable.

The present invention efficiently utilizes available stock materials that may otherwise be scrapped or recycled due to inadequate size thereof.

The present invention also provides an increase in performance of components that may normally be formed of multiple pieces, due to the lack of adequately sized stock for unitary component formation. As such, the present invention reduces weight and minimizes crack initiation sites and potential leak paths.

The present invention itself, together with further objects and attendant advantages, will be best understood by reference to the following detailed description, taken in conjunction with the accompanying drawing.

BRIEF DESCRIPTION OF THE DRAWINGS

For a more complete understanding of this invention reference should now be bad to the embodiments illustrated in greater detail in the accompanying figures and described below by way of examples of the invention wherein.

DETAILED DESCRIPTION

Figure 1:
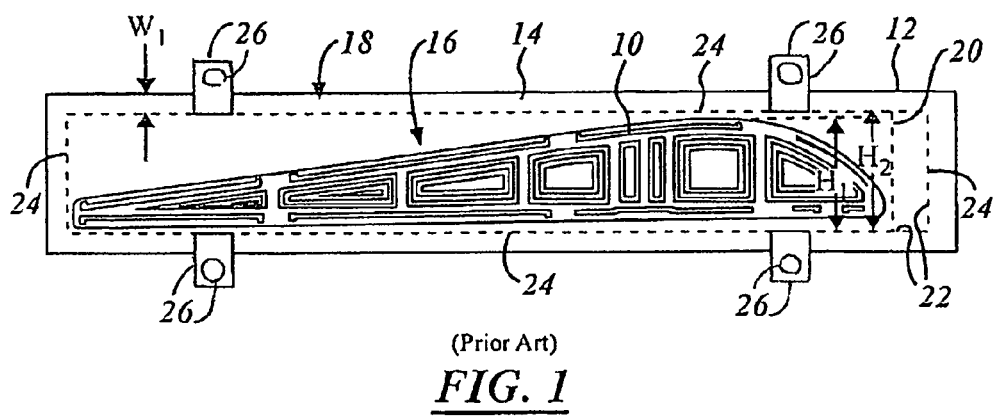
FIG. 1 is a top view of a component machined out of a billet of material that has a picture frame perimeter.

In each of the following Figures, the same reference numerals are used to refer to the same components. The present invention provides various machining techniques that may be utilized in forming or creating various components for aeronautical applications, land-based vehicle applications, non-vehicle applications, or other applications known in the art that require similar machining.

In the following description, various operating parameters and components are described for one constructed embodiment. These specific parameters and components are included as examples and are not meant to be limiting.

Also, in the following description the terms "billet" or "billet of material" refers to a stock piece of material, which may be in a solid or hollow semi-finished form. A billet may be used to form long tubular products such as bars and channels. A billet may be generally round or square in shape or may be of various other shapes. A billet has been hot worked by forging, rolling, or extrusion and is generally destined for further processing or machining to form one or more components. A billet, although commonly having a size and shape of approximately two to seven inches thick, may be of various size and shape. There is an infinite amount of components that may be machined from a billet.

In addition, in the following description the term "forging" is defined as the forming of a hot or cold metallic material into a fixed shape by hammering, upsetting, pressing, or rolling.

As well, in the following description the term "machining" is defined as a process in which excess or unwanted stock is removed from a billet of material by the use of machine tools. Machining may be performed for rough or finish turning, boring, drilling, milling, or other known machining tasks.

In the following description the term "excess material" refers to the material of a billet that does not make up the component to be machined. In general, excess material is the material that is removed from a billet during a machining process, or that is a part of the billet outside of the boundary of the finished component, including material needed for clamping and hold down. Some excess material may be removed prior to or subsequent to the machining process. For example, large excess amounts of material may be removed prior to machining to ease in handling and performing the machining process. As another example, small amounts of material may be removed subsequent to the machining process, such as to finish a certain area or to remove material in tabbed areas of a billet. Tabbed areas are explained in further detail below.

Referring now to FIG. 1, a top view of a component 10 machined out of a billet of material 12 that has a picture frame perimeter 14 is shown. The billet 12 has a center portion 16 and an outer frame portion 18. The center portion 16 refers to the component milling area or area in which the component is to be formed or milled therefrom. The component 10, in the example shown, is an airfoil.

The center portion 16 has a first set of outer dimensions that are associated with a polyhedron boundary 20. The polyhedron boundary 20 may or may not coincide with the inner boundaries 22 of the picture frame 14. The polyhedron boundary, generally, refers to the outer surface of the minimum volume needed to mill the component desired. In other words, the outer overall dimensions of the polyhedron boundary 20 are approximately equal to the outer overall dimensions of the component 10. For example, the height $H_1$ of the component 10 is approximately equal to the height $H_2$ of the polyhedron boundary 20. In the example shown, this also holds true for the length and width of the component 10 and the polyhedron boundary 20, although not shown.

Figure 5:
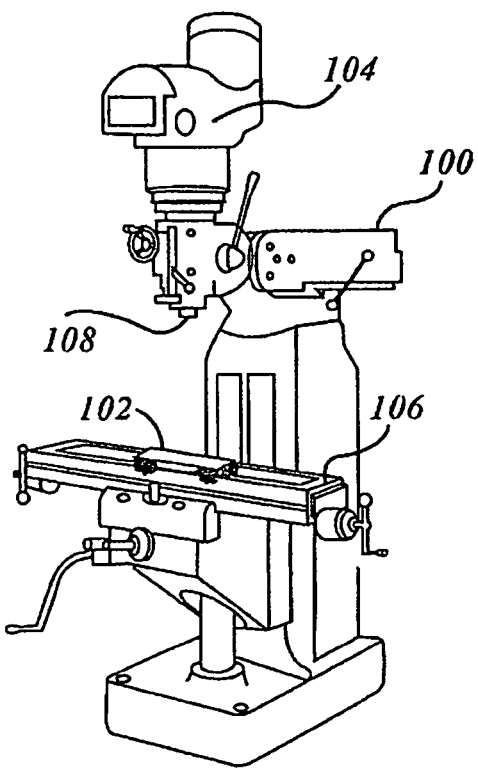
FIG. 5 is a perspective view of a 3-axis milling machine having a tabbed billet of material placed thereon and in accordance with an embodiment of the present invention.
Figure 6:
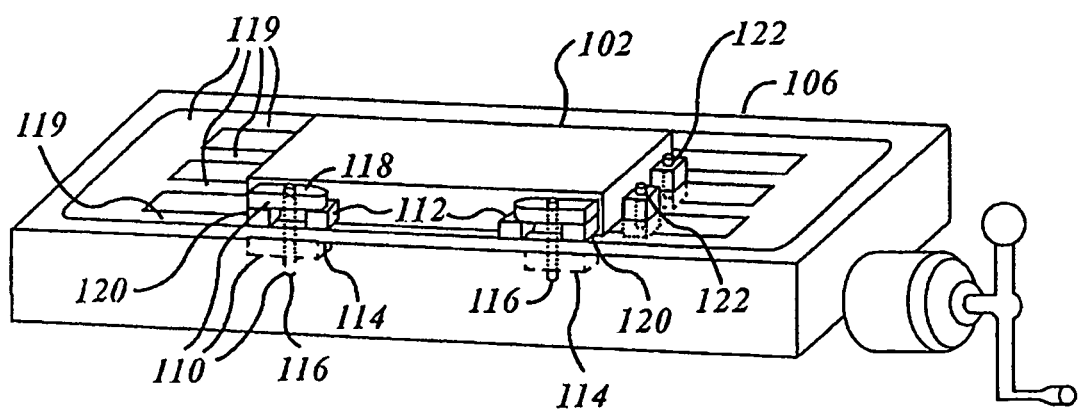
FIG. 6 is a perspective close-up view of a machining table having the tabbed billet of material of FIG. 5 fixed thereon.

The frame portion 18 refers to the excess material that surrounds the center portion 16 and that is used to rigidly fix the billet 12 to a machining table, such as the machining table that is shown in FIGS. 5 and 6. The frame portion 18 has a second set of outer dimensions that are all greater than the corresponding dimensions of the first set of outer dimensions. The width $W_1$ of the frame portion 18 is typically and approximately 1-3 inches wide to provide adequate material for grabbing and holding the billet 12 to the machining table. The frame portion 18, although continuous, does not necessarily surround all sides of the center portion 16. In the example shown, the picture frame 14 surrounds four sides 24 of the center portion 16.

Machine table fasteners 26 are shown to illustrate the relationship between the fasteners 26, the picture frame 14, and the component 10. The fasteners 26 are placed over the picture frame 14 and not the center portion 16 and hold the billet 12 in place on a machining table. Note that a large portion of the picture frame 14 is not utilized in the holding of the billet 12.

Figure 2:
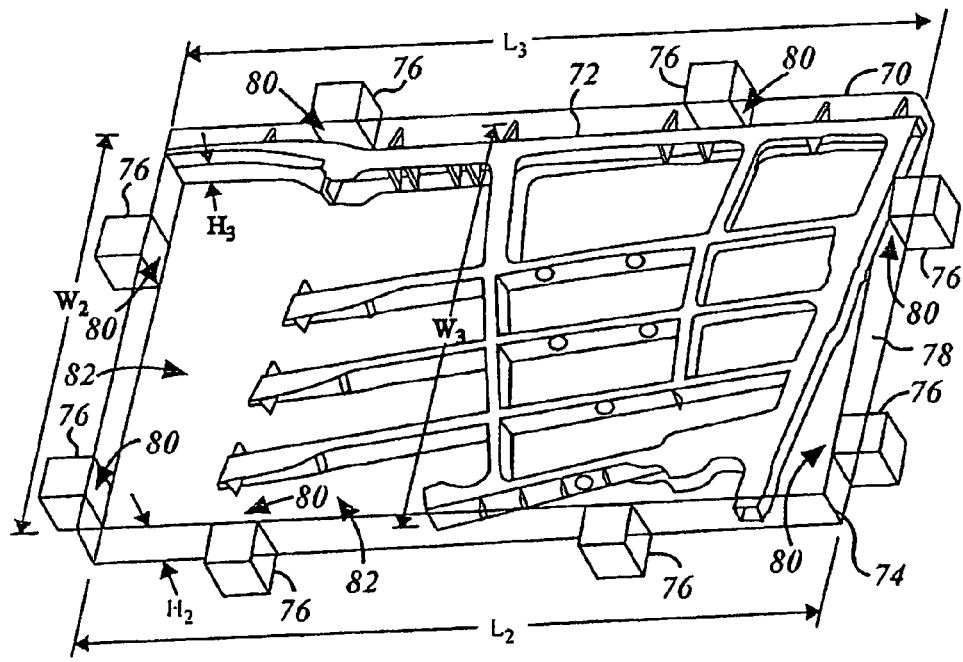
FIG. 2 is a block diagrammatic view of a machining system in accordance with an embodiment of the present invention.

Referring now to FIG. 2, a block diagrammatic view of a machining system 50 in accordance with an embodiment of the present invention is shown. The machining system 50 includes a controller 52, a tab-forming mechanism 54, an attachment mechanism 56, and a milling machine 58. The controller 52 is used as a tool aid in the preparation process of a billet of material prior to machining of a component therefrom. The tab-forming mechanism 54 is used to form the holding tabs that are to be attached to the billet for fixation onto a machining table, such as the machining table shown in FIGS. 5 and 6. The tabs may be held in the tab-retaining bin 60. The attachment mechanism 56 is used to attach the tabs to the billet. The milling machine 58 is used to machine the billet to form the component. The machining system 10 may also include other tools, such as a cutting tool 62 and a finishing tool 64. Example billets of material, components, and tabs are shown and described with respect to the embodiments of FIGS. 3, 4A, and 4B.

The controller 52, the tab-forming mechanism 54, the attachment mechanism 56, the milling machine 58, the tools 62 and 64, and any other elements of the machining system 10 may be integrally coupled to each other electronically, mechanically, pneumatically, hydraulically, or via some other known technique, as represented by dashed lines 66, or may be separate individual elements or some combination thereof. Some or all of the stated elements may be utilized in cooperation via robotics, conveyors, or other known equipment 68 for the transfer, manipulation, adjustment, and altering of materials and tools between elements.

The controller 52, in a simplistic form, may be used as a memory, calculator, and indicator, or may be used to control the operations of the entire machining system. The controller 52 may be microprocessor based such as a computer having a central processing unit, memory (RAM and/or ROM), and associated input and output buses. The controller 52 may be an application-specific integrated circuit or may be formed of other logic devices known in the art. The controller 52 may be a portion of a central main control unit, an interactive module, or a control circuit having a power supply. The controller 52 may be combined into a single integrated controller or may be a stand-alone controller as shown. The controller 52 may have computer aided design and drafting tools stored thereon for viewing, creating, altering, storing, and manipulating 3-dimensional component designs.

The controller 52 may be used to store component and available billet dimensions. The controller 52 may be used to select or may in and of itself select a component to be machined. The dimensions of the component may be received by the controller 52 or retrieved from a memory contained therein or coupled thereto. The controller 52 also in response to the component dimensions calculates the minimum dimensions required for a billet from which the component may be machined. In response to the dimensions of the billet, the controller 52 also determines the appropriate number of tabs to be attached to the billet and appropriate locations of those tabs.

The tab-forming mechanism 54 may include the controller 52 or another separate controller (not shown). The tab-forming mechanism 54 may be in the form of a forging, rolling, extrusion, cutting, or welding machine or some combination thereof The tab-forming mechanism 54 forms the tabs from available stock, available scrap, or from some other available materials. The available materials may be altered or combined to form the tabs desired. Note that the available materials may be of appropriate size and shape without the altering thereof, in which case the materials are simply held in the tab-retaining bin 60 or transferred for attachment to the billet of concern.

The tabs may be formed of various materials and of various material combinations. The materials of the tabs are not necessarily the same as the materials of the billet upon which they are attached. The tabs may be formed of aluminum, iron, steel, alloy, magnesium, titanium or some other metallic material(s) or non-metallic material(s) that may be fused to a billet. The tabs may also be of various sizes, shapes, and styles. The tabs may be solid or hollow in form.

The attachment mechanism 56 may be of various types and styles. The attachment mechanism 56 may be in the form of a welding machine, a friction-welding machine, a fusion machine, or some other machine used to integrally combine and attach two metallic pieces of material to each other. The attachment mechanism 56 may be used to weld, friction weld, diffusion weld, solid-state weld, linear friction weld, fusion weld, or friction stir weld the tabs to the billet. Position control and/or force control may be used to control the welding process. Position control refers to the control of the billet or component position during the welding process. Force control refers to the control of the load or force applied by the welding machine onto the surfaces being fused together. The welds formed during the attachment process are of adequate strength and quality to withsand the milling or machining process of a component. Full penetration welds are not required.

The milling machine 58 may be of various types and styles known in the art. An example of a 3-axis milling machine that may be utilized is shown in FIG. 5.

The cutting tool 62 may be used to remove the tabs upon removal of the billet or component from the machining table. The cutting tool 62 may be in the form of a welding machine, a band saw, a laser, an acetylene/oxygen torch or the like, or some other cutting tool known in the art.

The finishing tool 64 may be used to remove any remaining excess material on the component, such as in associated tab areas. The finishing tool 64 may be in the form of a sander, a die grinder, or some other hand or stand held finishing tool. Also, the milling machine 58 may be used as a finishing tool.

Figure 3:
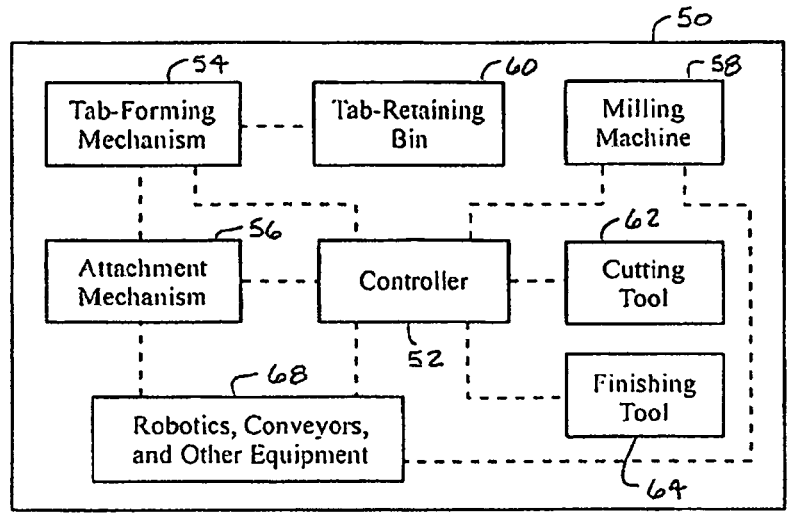
FIG. 3 is a perspective view of an example tabbed billet of material illustrating layout of a component to be machined therefrom and in accordance with an embodiment of the present invention.

Referring now to FIG. 3, a perspective view of an example tabbed billet of material 70 is shown illustrating the layout of a component 72 to be machined therefrom and in accordance with an embodiment of the present invention. The billet 70 has outer dimensions that are at least large enough to encompass the component 72. The billet 70 also has outer overall dimensions that are approximately equal to the outer overall dimensions of the component 72 or dimensions of the polyhedron component boundary 74. The polyhedron boundary 74, in the example shown coincides with the outer dimensions of the billet 70 and of the component 72. For example, the overall length $L_2$, width $W_2$, and height $H_2$ of the billet 70 is approximately equal to the overall length $L_3$, width $W_3$, and height $H_3$ of the component 72. The billet 70 has attached thereto multiple holding tabs 76. The tabs 76 are placed and attached at predetermined locations around the perimeter surface 78 of the billet 70. The areas of the billet 70 near the stated locations may be referred to as the tab attachment areas 80. The number and locations of the tabs 76 are such to assure that the billet 70, when fastened to a machine table in those locations, does not move during the machining process.

Note that the billet 70 may also, or as an alternative to the use of some of the tabs 76, be held and fixed to the machining table in excess material locations, such as locations 82. In certain locations on the billet 70, such as the locations 82, in which there is adequate material area to grab and hold the billet 70 and adequate material area as to not interfere with milling machine tools, the billet 70 may be held and fixed to the machining table. This minimizes the number of tabs used.

Figure 4A:
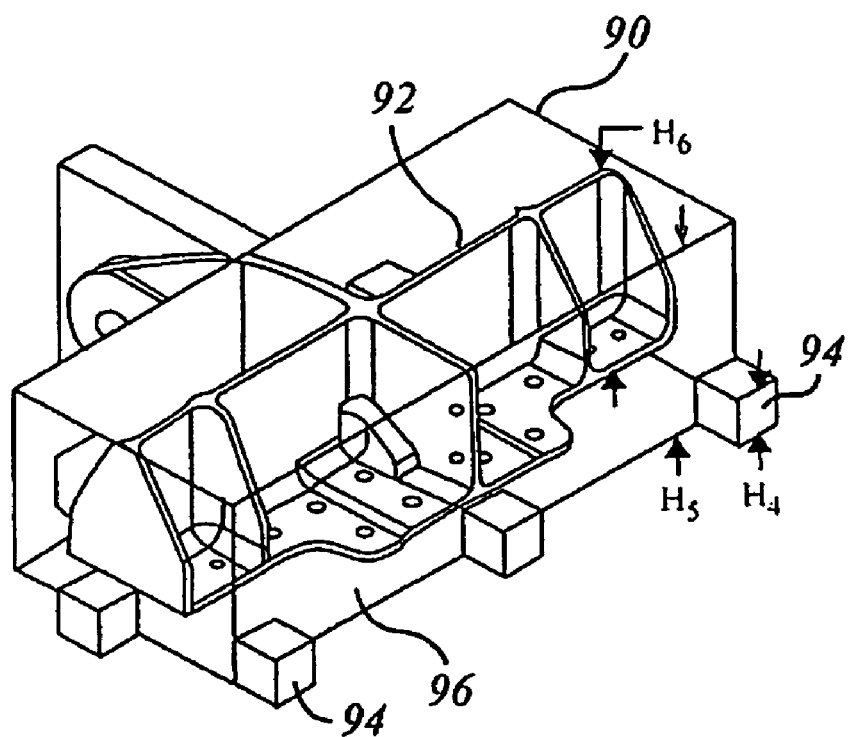
FIG. 4A is a perspective view of another example tabbed billet of material illustrating layout of a component to be machined therefrom and in accordance with an embodiment of the present invention.
Figure 4B:
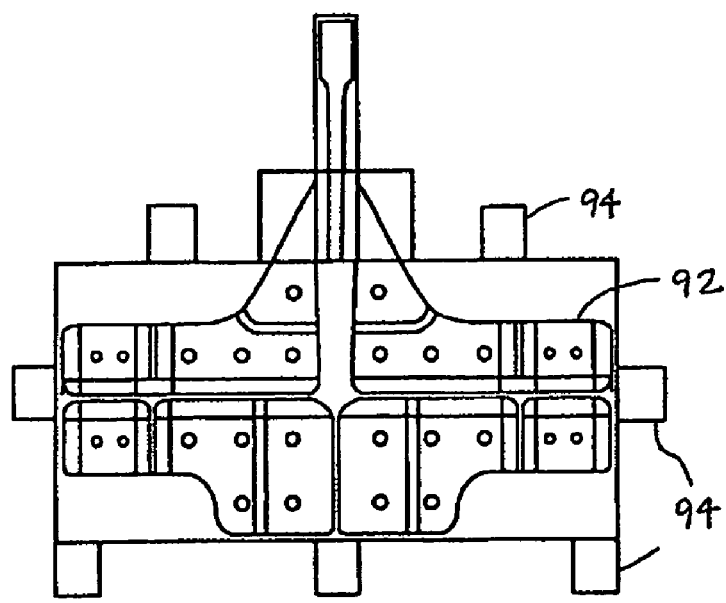
FIG. 4B is a top view of the tabbed billet of material of FIG. 4A.

Referring now to FIGS. 4A and 4B, perspective and top views of another example tabbed billet of material 90 is shown illustrating layout of a component 92 to be machined therefrom and in accordance with an embodiment of the present invention. Similar to the billet 70 and the component 72, the billet 90 has overall dimensions that are approximately equal to the overall dimensions of the component 92. The height $H_4$ of the tabs 94, however, are not of the same height $H_5$ as the billet 90 or the same height $H_6$ as the component 92, as the tabs 76 are in comparison with the billet 70 and the component 72. Also, the tabs 94 are attached flush with the bottom surface 96 of the billet 90 for fastening to a machine table.

Although the overall dimensions of the billets 70 and 90 are approximately equal to the overall dimensions of the components 72 and 92, the billets used, in general, to form components may have one or more overall dimensions that are larger than the corresponding dimensions of the components formed. The present invention allows one to utilize stock that is not large enough to provide a picture frame, as defined above, but yet is large enough to machine the component desired.

Referring now to FIGS. 5-6, a perspective view of a 3-axis milling machine 100 having a tabbed billet of material 102 placed thereon and a perspective close-up view of a machining table 106 having the billet 102 rigidly fixed thereon and in accordance with an embodiment of the present invention are shown. The milling machine 100 includes a head 104 and the machining table 106. The head 104 has a spindle 108 that can be moved vertically relative to the machining table 100. The machining table 106 is capable of moving longitudinally and laterally relative to the head 104. The stated movement provides the 3-axis of relative movement or degrees of freedom. The milling machine 100 has several adjustments. A couple of adjustments are associated with the ability of the head 104 to be tilted at various angles and the ability of the machining table 100 to be raised or lowered. Another adjustment is associated with the ability to alter the rotational speed of the spindle 108. Other adjustments are not herein described.

The billet 102 is clamped or rigidly fixed to the table 106 via fastening devices 110 to prevent movement of the billet 102 during machining. In the example shown, the fastening devices 110 are used to hold the billet 102 by the tabs 112 to the table 106. The fastening devices 110 are configured for attachment to the table 106. The fastening devices 110 include anchors 114, threaded bolts 116, and hold-downs 118. The anchors are slid into grooves 119 within the table 106 and placed near the tabs 112. The hold-downs 118 are placed over the tabs 112, the anchors 114, and the bridging blocks 120. The bolts 116 are extended through the hold-downs 118 and into the anchors 114. When the tabs 112 have holes 122 therethrough, the threaded bolts 116 may extend through the tabs 112 and be threaded into the anchors 114 without use of the hold-downs 118 and the bridging blocks 120.

The above-described fastening techniques for holding a tabbed billet to a machining table are provided only as possible examples. Of course, various other fastening techniques may be used.

Figure 7:
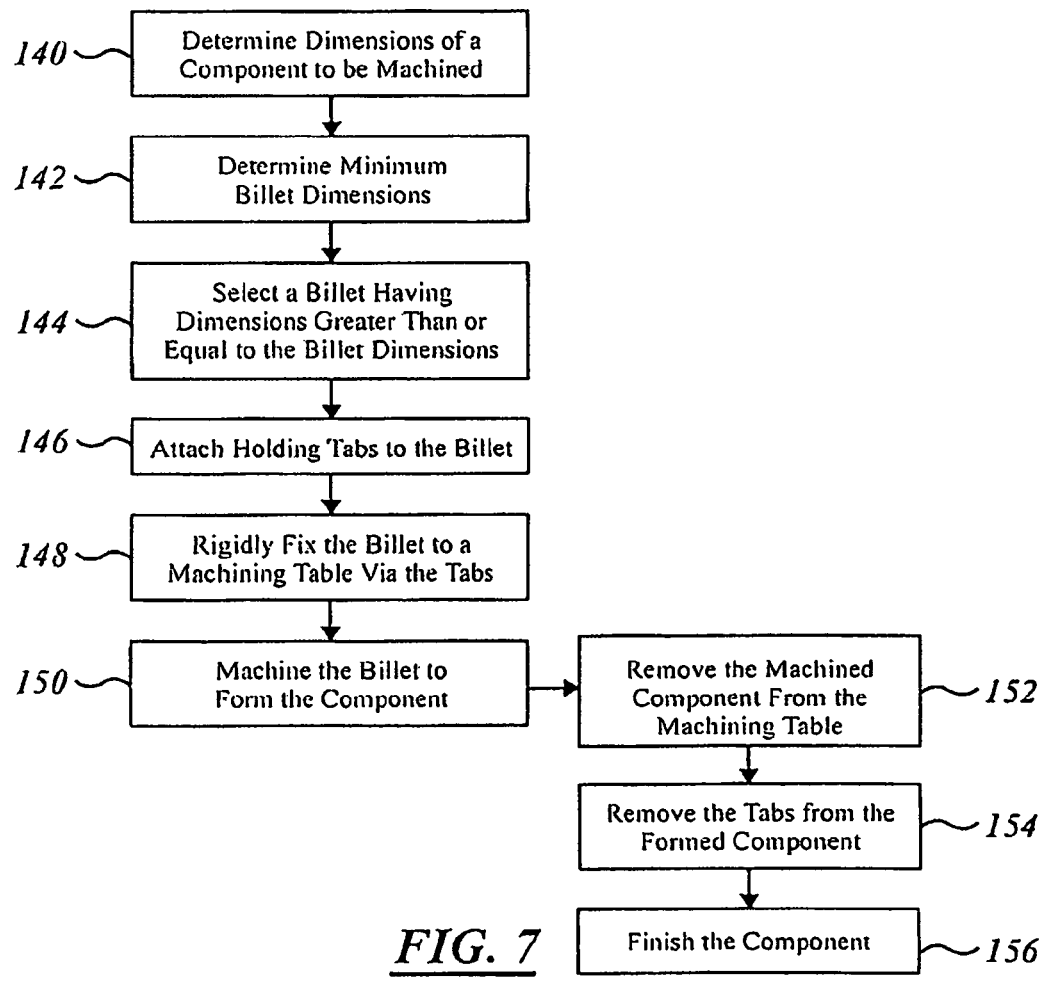
FIG. 7 is a logic flow diagram illustrating a method of machining a component in accordance with an embodiment of the present invention.

Referring now to FIG. 7, a logic flow diagram illustrating a method of machining a component in accordance with an embodiment of the present invention is shown.

In step 140, a first set of outer dimensions of a component to be machined is determined. This may be performed manually, via a controller, such as the controller 52, or by some other method known in the art. The first dimensions may also be entered into the controller. In step 142, minimum dimensions of a billet are determined such that the billet has adequate size to machine the component therefrom. The minimum dimensions are in the form of a second set of outer dimensions. Dimensions of the second set of outer dimensions are equal to or greater than the corresponding dimensions of the first set of outer dimensions.

In step 144, a billet of material is selected from available stock or elsewhere in response to the second set of outer dimensions. The billet may be selected by the controller via various equipment, such as equipment 68, that is in operative coupling with the controller. The second set of outer dimensions may be in part less than that required to picture frame a component area of the billet. In step 146, holding tabs are attached to the billet. The tabs may be welded to the billet using a welding technique above-stated. The tabs may be attached to the billet on a machining table, such as the machining table 106. The tabs are attached around a perimeter of the billet at predetermined locations for proper mounting to the machining table.

In step 148, the billet is rigidly fixed to the machining table via the tabs. In step 150, the billet is machined to shape and remove material from and in a designated component area of the billet to form the component. The excess material removed from the billet may be only inside the polyhedron component boundary associated with the component, such as when the overall outer dimensions of the billet are equal to the overall outer dimensions of the component The excess material removed from the billet may also be removed from areas of the billet that are outside of the polyhedron component boundary, such as when one or more of the overall dimensions of the billet are larger than the corresponding dimensions of the polyhedron component boundary.

In step 152, the machined component may be removed from the machining table. The machined component may be removed from the machining table prior to or subsequent to either steps 154 and 156. In step 154, the tabs are removed from the remaining billet or from the now formed component using a cutting tool, such as the cutting tool 62. The tabs may be cut from the component. In step 156, the component is finely altered or finished using a finishing tool, such as the finishing tool 64. The component, for example, may be sanded in the tab attachment areas and/or polished to remove any burs or other imperfections.

The component formed in the above-described method may be substantially or completely formed on the machining table and not via a forging process. The tabs are attached prior to the machining of the component and are removed upon completion of the machining process. Also, the above-described steps are meant to be illustrative examples; the steps may be performed sequentially, synchronously, simultaneously, or in a different order depending upon the application.

The present invention provides machining techniques that efficiently utilize available stock and scrap materials, thus, reducing the amount of stock needed and normally purchased. The present invention allows for the formation of machined components using a smaller amount of material than normally needed in the past, which minimizes costs associated with the stated formation.

The above-described apparatus and method, to one skilled in the art, is capable of being adapted for various applications and systems including: aeronautical systems, land-based vehicle systems, or other applications or systems known in the art that require servicing of a vehicle. The above-described invention can also be varied without deviating from the true scope of the invention.

What is claimed is:

1. A method of holding a billet of material to a machining table comprising:
   determining a first set of outer dimensions of a component to be machined
   wherein said component is substantially formed on the machining table and not via a forging process;
   selecting the billet of material in response to said first set of outer dimensions, whereby said billet has a second set of outer dimensions and said second set of outer dimensions are approximately equal to or greater than corresponding dimensions of said first set of outer dimensions and whereby said first and second sets of outer dimensions define a frame surrounding at least a portion of excess billet material to be machined said portion comprising excess billet material inside a polyhedron component boundary of the billet;
   attaching a plurality of tabs to the perimeter of said frame portion of excess billet material; and
   rigidly fixing said plurality of tabs to the machining table.

2. A method as in claim 1 wherein said plurality of tabs are formed of at least one material selected from aluminum, iron, steel, alloy, magnesium, and titanium.

3. A method as in claim 1 wherein attaching said plurality of tabs comprises welding said tabs to the billet of material.

4. A method as in claim 1 wherein attaching said plurality of tabs comprises utilizing a welding technique selected from at least one of friction welding, diffusion welding, solid state welding, linear friction welding, fusion welding, and friction stir welding.

5. A method as in claim 1 wherein attaching said plurality of tabs to the billet of material is performed on the machining table.

6. A method as in claim 5 wherein said plurality of tabs are friction stir welded to the billet of material on the machining table.

7. A method as in claim 5 wherein said friction stir welding is performed using at least one control technique selected from position control and force control.

8. A method as in claim 1 wherein said plurality of tabs are attached at predetermined locations on the billet of material.

9. A method as in claim 1 wherein said plurality of tabs comprise scrap material.

* * * * *